(12) United States Patent
Takahata et al.

(10) Patent No.: US 9,997,768 B2
(45) Date of Patent: Jun. 12, 2018

(54) LITHIUM ION SECONDARY BATTERY AND METHOD FOR MANUFACTURING LITHIUM ION SECONDARY BATTERY

(75) Inventors: Koji Takahata, Toyota (JP); Hideki Sano, Daito (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 122 days.

(21) Appl. No.: 13/990,837

(22) PCT Filed: Dec. 6, 2010

(86) PCT No.: PCT/JP2010/071844
§ 371 (c)(1),
(2), (4) Date: May 31, 2013

(87) PCT Pub. No.: WO2012/077176
PCT Pub. Date: Jun. 14, 2012

(65) Prior Publication Data
US 2013/0252111 A1    Sep. 26, 2013

(51) Int. Cl.
*H01M 4/133*  (2010.01)
*H01M 4/1393*  (2010.01)
*H01M 4/587*  (2010.01)
*H01M 4/04*  (2006.01)
*H01M 4/36*  (2006.01)
*H01M 4/62*  (2006.01)
*H01M 10/0525*  (2010.01)
*H01M 4/02*  (2006.01)

(52) U.S. Cl.
CPC ......... *H01M 4/133* (2013.01); *H01M 4/0404* (2013.01); *H01M 4/1393* (2013.01); *H01M 4/364* (2013.01); *H01M 4/587* (2013.01); *H01M 4/625* (2013.01); *H01M 10/0525* (2013.01); *H01M 2004/021* (2013.01); *H01M 2220/20* (2013.01); *Y02E 60/122* (2013.01); *Y02P 70/54* (2015.11); *Y10T 29/49115* (2015.01)

(58) Field of Classification Search
None
See application file for complete search history.

(56) References Cited

U.S. PATENT DOCUMENTS

2005/0164090 A1    7/2005  Kim et al.
2008/0057401 A1    3/2008  Mori et al.

FOREIGN PATENT DOCUMENTS

| CN | 1649190 A | 8/2005 |
|---|---|---|
| JP | 8-138671 | 5/1996 |
| JP | 2002-100410 | 4/2002 |
| JP | 2005-71918 | 3/2005 |
| JP | 2008-59999 | 3/2008 |
| JP | 2009-176448 | 8/2009 |
| JP | 2009-193924 | 8/2009 |
| JP | 2012-015051 | 1/2012 |
| WO | WO 2012/153393 A1 | 11/2012 |

OTHER PUBLICATIONS

Smalc et al. "Thermal Performance of Natural Graphite Heat Spreaders" 2005.*

* cited by examiner

*Primary Examiner* — Ladan Mohaddes
(74) *Attorney, Agent, or Firm* — Finnegan, Henderson, Farabow, Garrett & Dunner, LLP

(57) ABSTRACT

A lithium ion secondary battery involves a negative electrode sheet including a negative current collector and a negative active material layer that contains negative active material particles including first particles and second particles. In the negative active material layer, the ratio of the first particles to the total negative active material particles in a part on the current collector side in the layer thickness direction of the negative active material layer is higher than the ratio of the first particles to the total negative active material particles in the whole negative active material layer and the ratio of the second particles to the total negative active material particles in a part on an outer surface side of the negative active material layer in the layer thickness direction is higher than the ratio of the second particles to the total negative active material particles in the whole negative active material layer.

12 Claims, 10 Drawing Sheets

LITHIUM ION SECONDARY BATTERY AND METHOD FOR MANUFACTURING LITHIUM ION SECONDARY BATTERY

CROSS-REFERENCE TO RELATED APPLICATIONS

This application is a national phase application of International Application No. PCT/JP2010/071844, filed Dec. 6, 2010, the content of which is incorporated herein by reference.

TECHNICAL FIELD

The present invention relates to a lithium ion secondary battery using a negative active material layer containing a plurality of kinds of negative active material particles, and a method for manufacturing the lithium ion secondary battery.

BACKGROUND ART

In recent years, chargeable/dischargeable lithium ion secondary batteries (hereinafter, simply referred to as batteries) have been used as drive power sources of hybrid vehicles and portable electronic devices such as a notebook-sized personal computer and a video camcorder.

As for such batteries, for example, Patent Document 1 discloses a lithium ion secondary battery in which two kinds of carbonaceous materials (negative active material particles), i.e., graphite and low-temperature carbonized carbon (low crystalline carbonaceous materials), are used for a negative electrode material (a negative active material layer) of a negative electrode (a negative electrode sheet)

RELATED ART DOCUMENTS

Patent Documents

Patent Document 1: JP-A-2002-100410

SUMMARY OF INVENTION

Problems to be Solved by the Invention

However, the battery manufacturing method in Patent Document 1 only discloses a negative electrode material (a negative active material layer) containing uniformly mixed carbon and low-temperature carbonized carbon which is an amorphous carbon.

Meanwhile, the inventors investigated the battery characteristics of a battery A using only graphite as negative active material particles of a negative electrode sheet (a comparative battery C1 mentioned later), a battery B using only low-temperature carbonized coke as negative active material particles of a negative electrode sheet (a comparative battery C2 mentioned later), and a battery C using a negative active material layer containing uniformly mixed graphite and low-temperature carbonized coke, which is an amorphous carbon (a comparative battery C3 mentioned later).

According to the above investigation, it was found that the internal resistance of each battery at an initial stage was low in the order of the battery A, battery C, and battery B (A<C<B). The low-temperature carbonized coke used as the negative active material particles is amorphous, which is lower in electronic conductivity than graphite. It is therefore conceived that, among the batteries A to C, the battery A that does not use the low-temperature carbonized coke as the negative active material particles has lowest internal resistance and the battery B that uses only the low-temperature carbonized coke as the negative active material particles has highest internal resistance.

On the other hand, it was found that the capacity retention rate of a battery subjected to a low-temperature pulse cycle test (a "0° C.-pulse cycle test" which will be mentioned later") was high in the order of the battery B, battery C, and battery A (B>C>A), which is reversed to the above internal resistance. This result is caused by the following. Graphite has anisotropy and thus portions for insertion/extraction of lithium ions are biased outward as compared with isotropic low-temperature carbonized coke. Accordingly, as compared with the low-temperature carbonized coke, transfer (outgoing and ingoing) of lithium ions in graphite (extraction of lithium ions from the inside and insertion (intercalation) of lithium ions into the inside) is less caused. Thus, lithium deposition is liable to be generated in case charge/discharge is performed with a relatively large current. It is therefore conceivable that, among the batteries A to C, the battery B not using graphite has a highest capacity retention rate and the battery A using only graphite as the negative active material particles has a lowest capacity retention rate.

The battery C using uniformly mixed graphite and low-temperature carbonized coke as the negative active material particles exhibits the intermediate characteristics regarding internal resistance and capacity retention rate between the battery A and the battery B. Specifically, the internal resistance could not be decreased to the degree of the battery using only graphite as the negative active material particles, whereas the capacity retention rate after the low-temperature pulse cycle test could not be increased to the degree of the battery using only low-temperature carbonized coke as the negative active material particles. In other words, the battery C using uniformly mixed graphite and low-temperature carbonized coke as the negative active material layer could not sufficiently obtain both the advantage of the battery A (low internal resistance) and the advantage of the battery B (high capacity retention rate).

The present invention has been made in view of the circumstances and has a purpose to provide a battery using graphite and amorphous carbon as negative active material particles, capable of providing both a low internal resistance and a high capacity retention rate after a low-temperature pulse cycle test. Furthermore, the present invention has another purpose to provide a method for manufacturing the battery.

Means of Solving the Problems

To achieve the above purpose, one aspect of the invention provides a lithium ion secondary battery comprising: a negative electrode sheet including a negative current collector sheet and a negative active material layer formed on the negative current collector sheet, the negative material layer containing negative active material particles; and a positive electrode sheet facing the negative electrode sheet through separators interposed therebetween, wherein the negative active material particles include at least first particles made of graphite and second particles made of amorphous carbon, the negative active material layer is configured so that: a ratio of an amount of the first particles to a total amount of the negative active material particles contained in a portion of the negative active material layer on a side close to the negative current collector sheet in a layer thickness direction is higher than a ratio of an amount of the first particles to a total amount of the negative active material particles contained in the negative active material layer, and a ratio of an amount of the second particles to a total amount of the negative active material particles contained in a portion of the negative active material layer on a side close to a surface in the layer thickness direction is higher than a ratio of an amount of the second particles to a total amount of the negative active material particles contained in the negative active material layer, the negative active material layer is formed of a plurality of layers laminated in the layer thickness direction, the layers including a first layer located on a side closest to the negative current collector sheet and a second layer located on a side closest to the surface, the negative active material particles of the first layer are composed of the first particles, the negative active material particles of the second layer are composed of the second particles, and the first layer has a density of 1.2 to 1.6 g/cm$^3$.

The above battery can achieve lower internal resistance and higher capacity retention rate after a low-temperature pulse cycle test as compared with a battery (the aforementioned battery C) containing graphite and amorphous carbon uniformly mixed in an entire negative active material layer.

Amorphous carbon allows easier outgoing and ingoing (transfer) of lithium ions as compared with graphite. This can suppress deposition of metal lithium on an own surface during charge and discharge. Accordingly, when the ratio of an amount of amorphous carbon (the second particles) to an amount of the negative active material particles in the portion of the negative active material layer, the portion forming the outer surface facing the positive electrode, is set to be high, the lithium ions are allowed to be easily inserted in the negative active material particles (the amorphous carbon) even during pulsed or high-rate charge. This makes it possible to suppress the lithium deposition on the negative active material layer and prevent a decrease in capacity retention rate after the low-temperature pulse cycle test.

On the other hand, graphite is higher in electronic conductivity than amorphous carbon. Thus, when the ratio of an amount of graphite (the first particles) to an amount of the negative active material particles in the portion of the negative active material layer, the portion contacting the negative current collector sheet, is set to be high, electrons are allowed to easily transfer between the first particles (graphite) and the negative current collector sheet. The internal resistance can thus be reduced.

In the above battery, the negative active material particles of the first layer are made of the first particles and the negative active material particles of the second layer are made of the second particles. Thus, the battery can surely provide both the low internal resistance and the high capacity retention rate after the low-temperature pulse cycle test. This internal resistance can be achieved as being substantially equal to that of a battery (the aforementioned battery A) using only graphite as the negative active material particles of the negative electrode sheet. The capacity retention rate can be achieved as being substantially equal to that of a battery (the aforementioned battery B) using only amorphous carbon as the negative active material particles of the negative electrode sheet.

Meanwhile, according to the study of the inventors, among batteries each including the negative active material layer having the first layer and the second layer, a battery in which the first layer has a density in a range of 1.2 to 1.6 g/cm$^3$ exhibits a higher capacity retention rate after a charge-discharge cycle test conducted with constant current (2 C) at 60° C. mentioned later as compared with a battery or batteries in which the first layer(s) has a density out of the above range.

It is to be noted that when batteries are subjected to the above test, Solid Electrolyte Interface (SEI) having low conductivity repeatedly is generated on negative active material particles by expansion and contraction of the negative active material particles in association with charge and discharge, causing consumption of lithium correspondingly, so that the capacity retention rate lowers. It is accordingly conceived that, as the capacity retention rate after the test is lower, particularly, more SEI is generated on the negative active material layer. However, in the battery including the first layer having a density of 1.2 to 1.6 g/cm$^3$, the first layer has been appropriately pressed. This battery does not cause deterioration of electronic conductivity due to expansion and contraction and breakage of the negative active material layer (the first layer) due to too high a density. Thus, it is conceived that the capacity retention rate rises after the charge-discharge cycle test conducted with constant current at 60° C.

Since the above battery can suppress the generation of SEI on the negative active material particles, therefore, the battery can provide the high capacity retention rate after the charge-discharge cycle test.

The graphite used as the first particles may include, for example, natural graphite such as flake graphite, vein graphite, and amorphous graphite, and artificial graphite, and also spheroidal graphite prepared by spheroidizing natural graphite or artificial graphite. The amorphous carbon used as the second particles may include, for example, low-temperature carbonized coke and hard carbon (non-graphitizable carbon).

In the aforementioned lithium ion secondary battery, further preferably, the negative active material layer is formed of the first layer and the second layer.

In the above battery, the negative active material layer is formed of only the first layer and the second layer. Therefore, the battery can be configured in a simple layer structure without including any layer between the first layer and the second layer of the negative active material layer. This configuration can provide an easily manufacturable battery.

In the aforementioned lithium ion secondary battery, further preferably, the second layer has a density of 1.2 g/cm$^3$ or less.

According to the study of the inventors, it was found that, among the batteries each including the negative active material layer having the first layer and the second layer, a battery in which the second layer has a density of 1.2 g/cm$^3$ or less exhibits a higher capacity retention rate after the pulse cycle test conducted at 0° C. as mentioned later as compared with a battery in which the second layer has a higher density than 1.2 g/cm$^3$.

From the above knowledge, in the above battery, the above capacity retention rate after the pulse cycle test can be increased. Accordingly, a battery is made usable for a long period even when charge and discharge are performed with large currents under low temperatures.

Alternatively, a vehicle may be provided with the lithium ion secondary battery described in one of the above configurations to use electric energy stored in this lithium ion secondary battery for all or part of power sources.

Since the above vehicle mounts the battery providing both the low internal resistance and the high capacity retention rate after the low-temperature pulse cycle test, the vehicle can have a stable battery performance.

Alternatively, another aspect of the invention provides a method for manufacturing a lithium ion secondary battery comprising: a negative electrode sheet including a negative current collector sheet and a negative active material layer formed on the negative current collector sheet, the negative material layer containing negative active material particles; and a positive electrode sheet facing the negative electrode sheet through separators interposed therebetween, wherein the negative active material particles includes at least first particles made of graphite and second particles made of amorphous carbon, the negative active material layer is configured so that: a ratio of an amount of the first particles to a total amount of the negative active material particles contained in a portion of the negative active material layer on a side close to the negative current collector sheet in a layer thickness direction is higher than a ratio of an amount of the first particles to a total amount of the negative active material particles contained in the negative active material layer, and a ratio of an amount of the second particles to a total amount of the negative active material particles contained in a portion of the negative active material layer on a side close to a surface in the layer thickness direction is higher than a ratio of an amount of the second particles to a total amount of the negative active material particles contained in the negative active material layer, the negative active material layer is formed of a plurality of layers laminated in the layer thickness direction, the layers including a first layer located on a side closest to the negative current collector sheet and a second layer located on a side closest to the surface, the negative active material particles of the first layer are composed of the first particles, the negative active material particles of the second layer are composed of the second particles, and the first layer has a density of 1.2 to 1.6 $g/cm^3$, wherein the method includes: a lamination coating step of applying active material paste containing the negative active material particles on the negative current collector sheet more than once to form a laminated coating film; and a drying step of drying the laminated coating film, and the lamination coating step uses active material pastes prepared so that the pastes to be coated for more upper layers have a higher or equal ratio of the second particles and a lower or equal ratio of the first particles relative to a total amount of the negative active material particles contained in own paste.

In the above battery manufacturing method, the lamination coating step uses the active material pastes prepared so that the pastes to be coated for more upper layers contain the second particles at a higher or equal ratio and the first particle at a lower or equal ratio to the total amount of the negative active material particles contained in own paste. Accordingly, the method can easily and reliably manufacture the battery provided with the negative electrode sheet configured such that the ratio of the amount of the first particles to the total amount of the negative active material particles in the portion of the negative active material layer on the side close to the negative current collector sheet in the layer thickness direction is set to high and the ratio of the amount of the second particles to the total amount of the negative active material particles in the portion of the negative active material layer on the side close to the outer surface in the layer thickness direction is set to be high. Consequently, the battery can be manufactured to provide both the low internal resistance and the high capacity retention rate after the low-temperature pulse cycle test.

Alternatively, another aspect of the invention provides a method for manufacturing a lithium ion secondary battery comprising: a negative electrode sheet including a negative current collector sheet and a negative active material layer formed on the negative current collector sheet, the negative material layer containing negative active material particles; and a positive electrode sheet facing the negative electrode sheet through separators interposed therebetween, wherein the negative active material particles includes at least first particles made of graphite and second particles made of amorphous carbon, the negative active material layer is configured so that: a ratio of an amount of the first particles to a total amount of the negative active material particles contained in a portion of the negative active material layer on a side close to the negative current collector sheet in a layer thickness direction is higher than a ratio of an amount of the first particles to a total amount of the negative active material particles contained in the negative active material layer, and a ratio of an amount of the second particles to a total amount of the negative active material particles contained in a portion of the negative active material layer on a side close to a surface in the layer thickness direction is higher than a ratio of an amount of the second particles to a total amount of the negative active material particles contained in the negative active material layer, the negative active material layer is formed of a plurality of layers laminated in the layer thickness direction, the layers including a first layer located on a side closest to the negative current collector sheet and a second layer located on a side closest to the surface, the negative active material particles of the first layer are composed of the first particles, the negative active material particles of the second layer are composed of the second particles, and the first layer has a density of 1.2 to 1.6 $g/cm^3$, wherein the method includes: a coating step of applying active material paste containing the negative active material particles on the negative current collector sheet or on a lower-layer negative active material layer made of already coated and dried active material paste; and a drying step of drying the coated paste, the coating step and the drying step being alternately repeated, and the coating step uses the active material pastes prepared so that the pastes to be coated at later stages have a higher or equal ratio of the second particles and a lower or equal ratio of the first particles relative to a total amount of the negative active material particles contained in own paste.

In the above battery manufacturing method, the coating step and the drying step are alternately repeated. The coating step uses the active material pastes prepared so that the pastes to be coated at later stages contain the second particles at a higher or equal ratio and the first particles at a lower or equal ratio to the total amount of the negative active material particles contained in own paste. Accordingly, the method can easily and reliably manufacture the battery provided with the negative electrode sheet configured such that the ratio of the amount of the first particles to the total amount of the negative active material particles in the portion of the negative active material layer on the side close to the negative current collector sheet in the layer thickness direction is set to high and the ratio of the amount of the second particles to the total amount of the negative active material particles in the portion of the negative active material layer on the side close to the outer surface in the layer thickness direction is set to be high. Consequently, the battery can be manufactured to provide both the low internal resistance and the high capacity retention rate after the low-temperature pulse cycle test.

Figure 1:
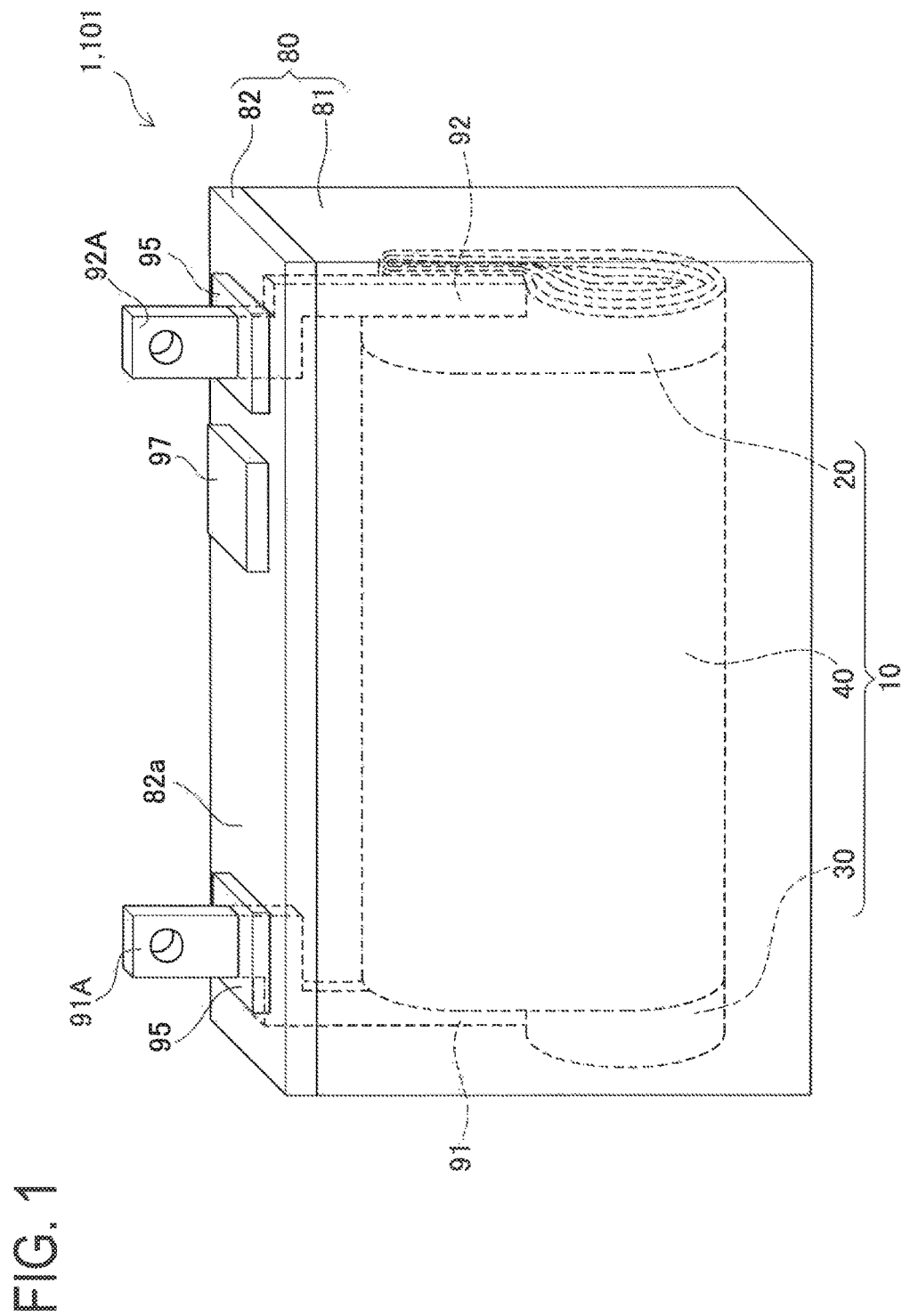
FIG. 1 is a perspective view of batteries of first and second embodiments and a modified example.

REFERENCE SIGNS LIST 1, 101 Battery (Lithium ion secondary battery)
20 Negative electrode sheet
21 Negative active material layer
21F Surface
21PA First paste
21PB Second paste
22 Negative active material particles
22A First particles
22B Second particles
28 Copper foil (Negative current collector sheet)
30 Positive electrode sheet
40 Separator
DT Layer thickness direction
L1 First layer (Portion on a negative current collector sheet side)
L1B Uncompressed first layer (Lower-layer negative active material layer)
L2 Second layer (Portion on an outer surface side)
PS Laminated coating film
Ra First ratio (Ratio of first particles to total negative active material particles)
Rb Second ratio (Ratio of second particles to total negative active material particles)

MODE FOR CARRYING OUT THE INVENTION

First Embodiment

A detailed description of a first preferred embodiment of the present invention will now be given referring to the accompanying drawings. A battery 1 of the first embodiment is first explained, referring to FIG. 1. This battery 1 is a lithium ion secondary battery including an electrode body 10 in which a strip-shaped positive electrode sheet 30, a strip-shaped negative electrode sheet 20, and strip-shaped separators 40 each interposed between the positive electrode sheet 30 and the negative electrode sheet 20 are wound together (see FIG. 1). In this battery 1, the electrode body 10 is accommodated in a battery case 80.

The battery case 80 includes a case body 81 and a closing lid 82, each being made of aluminum. The case body 81 has a bottom-closed rectangular tubular shape. Between this battery case 80 and the electrode body 10, an insulating film (not shown) made of resin and bent in a box-like form is interposed. The closing lid 82 has a rectangular plate-like shape and is welded to the main body 81 to close an opening of the main body 81. A positive current collecting member 91 and a negative current collecting member 92 connected to the electrode body 10 include, at respective leading ends, a positive terminal portion 91A and a negative terminal portion 92A each protruding through the closing lid 82 and upward from a lid surface 82a in FIG. 1. Between the closing lid 82 and each of the positive terminal portion 91A and the negative terminal portion 92A, insulating members 95 made of insulating resin are respectively interposed to insulate the terminal portions 91A and 92A. Furthermore, a rectangular plate-shaped safety valve 97 is also hermetically attached to the closing lid 82.

The electrode body 10 has a wound form configured such that the strip-shaped positive and negative electrode sheet 30 and 20 are wound in a flat form by interposing therebetween the strip-shaped separators 40 (see FIG. 1). In this electrode body 10, the positive electrode sheet 30 and the negative electrode sheet 20 face each other through the separators 40. The positive electrode sheet 30 and the negative electrode sheet 20 of this electrode body 10 are respectively joined to the positive current collecting member 91 or negative current collecting member 92, each having a plate-like shape bent like a crank (see FIG. 1).

The strip-shaped separators 40 each made of two polypropylene layers and one polyethylene layer sandwiched therebetween are interposed between the positive electrode sheet 30 and the negative electrode sheet 20 to separate them. The separators 40 are entirely impregnated in advance with electrolyte (not shown). This electrolyte is a non-aqueous electrolyte prepared in a manner that $LiPF_6$ is added as a solute to a mixed organic solvent containing ethylene carbonate (EC) and dimethyl carbonate (DMC) at a volume ratio of EC:DMC=3:7 to provide a lithium ion concentration of 1 mol/l.

The positive electrode sheet 30 includes a strip-shaped aluminum foil (not shown) and two strip-shaped positive active material layers (not shown) placed one each on both main surfaces of the aluminum foil. The positive active material layers each contain positive active material particles made of $LiNi_{1/3}Co_{1/3}Mn_{1/3}O_2$, a conductive material made of carbon black, and a binding material made of polyvinylidene fluoride (PVDF).

Figure 2:
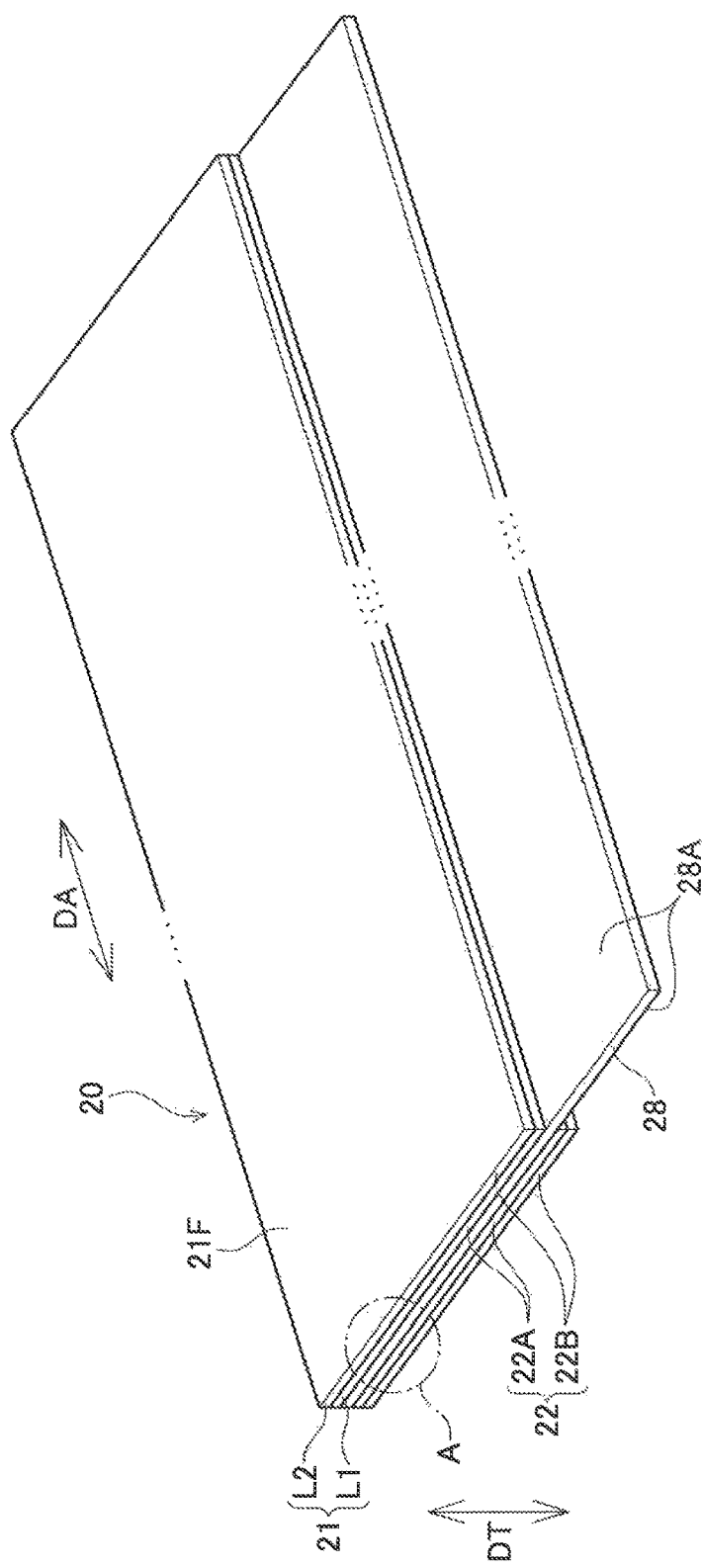
FIG. 2 is a perspective view of a negative electrode sheet of the first embodiment and the modified example.

On the other hand, the negative electrode sheet 20 includes a copper foil 28 made of copper in a strip shape extending in a longitudinal direction DA, and two strip-shaped negative active material layers 21 and 21 formed one each on both the main surfaces 28A and 28A of the copper foil 28, as shown in FIG. 2. This negative electrode sheet 20 faces the above positive electrode sheet 30 through the above separators 40.

Figure 3:
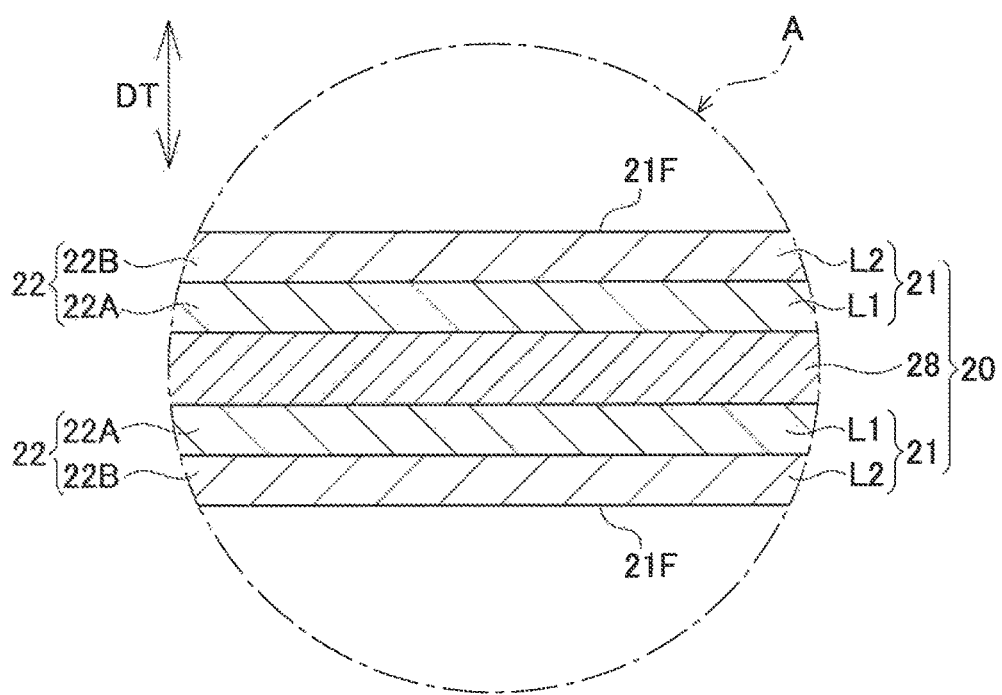
FIG. 3 is an enlarged cross sectional view of the negative electrode sheet (part A in FIG. 3) of the first embodiment and the modified example.

Each strip-shaped negative active material layer 21 extending in the longitudinal direction DA includes negative active material particles 22 (first particles 22A and second particles 22B mentioned below) and a binding material (not shown) made of PVDF. Each negative active material layer 21 is formed of two layers (a first layer L1 and a second layer L2) laminated in a layer thickness direction DT. In the negative active material layer 21, the first layer L1 is formed as a lower layer located on a side close to the copper foil 28 in the layer thickness direction DT and the second layer L2 on the first layer L1 is formed as an upper layer located on a side close to an outer surface 21F (see FIGS. 2 and 3). Furthermore, the first layer L1 and the second layer L2 have a density of 1.2 g/cm$^3$ and a density of 1.0 g/cm$^3$, respectively.

In each negative active material layer 21, the first layer L1 contains the first particles 22A made of natural graphite and the second layer L2 contains the second particles 22B made of low-temperature carbonized coke which is amorphous carbon. Specifically, in the first layer L1, a ratio (a first ratio Ra) of an amount of the first particles 22A to a total amount of the negative active material particles 22 contained in the first layer L1 is 100%, and a ratio (a second ratio Rb) of an amount of the second particles 22B to the total amount of the negative active material particles 22 contained in the first layer L1 is 0%. In the second layer L2, the first ratio Ra is 0% and the second ratio Rb is 100%.

The first particles 22A made of natural graphite (flake graphite) have an average particle diameter of 11.2 μm and a BET specific surface area of 4.6 m$^2$/g. The second particles 22B made of low-temperature carbonized coke have an average particle diameter of 14.9 μm and a BET specific surface area of 5.8 m$^2$/g. The BET specific surface areas of the first particles 22A and the second particles 22B are measured values by the method described in JIS (Japanese Industrial Standard) K6217-2.

An abundance ratio between the first particles 22A and the second particles 22B in the entire negative active material layer 21 including the first layer L1 and the second layer L2 is 1:1. In other words, the ratio of the amount of the first particles 22A to the total amount of the negative active material particles 22 contained in the negative active material layer 21 is 50 wt %. The ratio of the amount of the second particles 22B to the total amount of the negative active material particles 22 contained in the negative active material layer 21 is also 50 wt %.

In the negative active material layer 21 of the first embodiment, therefore, the first ratio Ra (100%) of the first particles 22A in the first layer L1 is set higher than the ratio (50 wt %) of the first particles 22A to the entire total negative active material layer 21. Similarly, the second ratio Rb (100%) of the second particles 22B in the second layer L2 is set higher than the ratio (50 wt %) of the second particles 22B to the entire negative active material layer 21.

The inventors made the following investigation about the characteristics of the battery 1 of the aforementioned first embodiment.

Firstly, the battery 1 which is a new (initial) battery just produced is subjected to measurement of battery capacity. To be specific, under a temperature environment of 25° C., the battery 1 is charged at a current of ⅓C until the voltage (terminal voltage) of the battery 1 becomes 4.1 V, and thereafter, the battery 1 is charged while keeping this voltage (constant current–constant voltage charge) for 2.5 hours. Furthermore, under the same temperature environment of 25° C., the battery 1 is subjected to constant current discharge at a constant current of ⅓C until the voltage of the battery 1 becomes 3.0 V, and thereafter the battery 1 is discharged for 4.0 hours while keeping the voltage at 3.0 V. An electric quantity (an electric charge amount) thus discharged is measured (hereinafter, also referred to as "battery capacity measurement"). The electric quantity measured at that time is referred to as an "initial battery capacity BC0" of the battery 1.

Subsequently, the battery 1 is subjected to a test conducted under a temperature environment of 0° C. to alternately repeat the constant current charge at a current of 30 C for 10 seconds and the constant current discharge at a current of 30 C for 10 seconds, for 250 cycles (hereinafter, also referred to as "0° C.-pulse cycle test").

Then, the battery 1 is subjected to the above battery capacity measurement again to measure the battery capacity of the battery 1 after the 0° C.-pulse cycle test. The battery capacity obtained at that time is referred to as a "first posttest battery capacity BC1". Thus, the capacity retention rate (a first capacity retention rate) of the battery 1 after the 0° C.-pulse cycle test is calculated (Table 1). This first capacity retention rate is a value (percentage) obtained by dividing the "first posttest battery capacity BC1" by the "initial battery capacity BC0" (BC1/BC0×100(%)).

TABLE 1

| | Negative Active Material Layer | | First Capacity Retention Rate (%) | Impedance Value (mΩ) |
|---|---|---|---|---|
| | Copper Foil Side in Lamination Direction | Surface Side in Lamination Direction | | |
| Battery 1 | First Layer L1 (Only 1$^{st}$ Particles) | Second Layer L2 (Only 2$^{nd}$ Particles) | 98.2 | 76.3 |
| Comparative Battery C1 | Single Layer (cont. only 1$^{st}$ particles) | | 91.4 | 76.1 |
| Comparative Battery C2 | Single Layer (cont. only 2$^{nd}$ particles) | | 98.4 | 82.1 |
| Comparative Battery C3 | Single Layer (cont. 1$^{st}$ and 2$^{nd}$ particles uniformly mixed) | | 95.9 | 79.2 |
| Comparative Battery C4 | Layer (Only 2$^{nd}$ Particles) | Layer (Only 1$^{st}$ Particles) | 92.2 | 81.9 |

On the other hand, comparative batteries C1, C2, C3, and C4 which are comparative examples of the battery 1 are additionally prepared and subjected to measurement of the battery characteristics in a similar manner to the measurement on the battery 1. As shown in Table 1, the comparative battery C1 is different from the battery 1 in that the battery C1 uses a negative electrode sheet having a negative active material layer formed in a single layer configuration containing only the first particles 22A (natural graphite) as the negative active material particles. The comparative battery C2 is different from the battery 1 in that the battery C2 uses a negative electrode sheet having a negative active material layer formed in a single layer configuration containing only the second particles 22B (low-temperature carbonized coke) as the negative active material particles. The comparative battery C3 is different from the battery 1 in that the battery C3 uses a negative electrode sheet having a negative active material layer formed in a single layer configuration containing the first particles 22A and the second particles 22B uniformly mixed. Further, the comparative battery C4 is different from the battery 1 in that the battery C4 uses a negative electrode sheet having a negative active material layer including a layer containing only the second particles 22B placed on a copper foil side in a layer thickness direction and a layer containing only the first particles 22A placed on an outer surface side in the layer thickness direction, reversely from the negative active material layer 21 of the battery 1.

Those comparative batteries C1, C2, C3, and C4 are subjected to battery capacity measurement in a similar manner to the measurement on the battery 1 to measure the initial battery capacity BC0 of each of the comparative batteries C1, C2, C3, and C4. As with the battery 1, subsequently, the 0° C.-pulse cycle test is performed and then the battery capacity measurement is conducted again to measure the first posttest battery capacity BC1 of each of the comparative batteries C1, C2, C3, and C4. The first capacity retention rate (the capacity retention rate after the 0° C.-pulse cycle test) of each battery is calculated (Table 1).

Furthermore, an impedance value of each of the battery 1 and the comparative batteries C1, C2, C3, and C4 is measured. To be concrete, the impedance value of each battery is measured by an AC impedance method (a frequency in a range of $10^{-1}$ to $10^5$ MHz) using an electrochemical impedance measuring device manufactured by Solartron. The impedance value of each battery is found by using circular arcs of Cole-Cole plot obtained by the above AC impedance method. That is, the impedance value is determined as the distance (an absolute value) from an original point on the complex plane presented as a Cole-Cole plot to an intersection between the Cole-Cole plot and an axis x (electric resistance).

Table 1 shows the impedance values of the batteries (the battery 1 and the comparative batteries C1, C2, C3, and C4).

Table 1 reveals that the first capacity retention rate of the battery 1 (98.2%) is second-highest after the comparative battery C2 (98.4%) and also sufficiently higher than the other batteries (comparative batteries C1, C3, and C4). Since natural graphite has anisotropy, ports for insertion/extraction of lithium ions are biased outward as compared with isotropic low-temperature carbonized coke. Accordingly, the low-temperature carbonized coke allows easier outgoing and ingoing of lithium ions as compared with the natural graphite. This can restrain deposition of metal lithium on the outer surface of the low-temperature carbonized coke when a battery is charged at a large amount of current. In the batteries (the battery 1 and the comparative battery C2) in which the second particles 22B (low-temperature carbonized coke) are much present on the outer surface side of the negative active material layer, it is conceivable that deposition of metal lithium is more restrained as compared with the other batteries (comparative batteries C1, C3, and C4), thereby preventing a decrease in first capacity retention rate.

On the other hand, Table 1 also shows that the impedance value (76.3 mΩ) of the battery 1 is second-smallest after the comparative battery C1 (76.1 mΩ) and also sufficiently smaller than the other batteries (the comparative batteries C2, C3, and C4). Natural graphite is higher in electronic conductivity than low-temperature carbonized coke which is amorphous. Accordingly, the batteries (the battery 1 and the comparative battery C1) in which the first particles 22A (natural graphite) are much present in the negative active material particles in a portion of the negative active material layer located on a copper foil side (in contact with the copper foil) more easily allow transfer (outgoing and ingoing) of electrons between the negative active material layer and the copper foil 28, so that the impedance value is more decreased as compared with the other batteries (comparative batteries C2, C4, and C 4).

The comparative battery C2 using only the second particles 22B (low-temperature carbonized coke) as the negative active material particles of the negative active material layer can increase the first capacity retention rate, but the impedance value is higher than those of the other batteries. The comparative battery C1 using only the first particles 22A (natural graphite) as the negative active material particles of the negative active material layer can reduce the impedance value, but the first capacity retention rate is lower than those of other batteries. As for the comparative battery C3 using the negative electrode sheet having the negative active material layer formed of a single layer containing the first particles 22A and the second particles 22B uniformly mixed as the negative active material particles, both of the first capacity retention rate and the impedance value are intermediate values between the comparative batteries C1 and C2. They are half-baked characteristics. The comparative battery C4 using a negative electrode sheet having a negative active material layer including the layer containing only the second particles 22B located on the copper foil side in the layer thickness direction and the layer containing only the first particles 22A located on the outer surface side in the layer thickness direction provides a second-lowest first capacity retention rate after the comparative battery C1, but a second-largest impedance value after the comparative battery C2. They are not advantageous characteristics. From the above results, it is also apprehensible that the battery 1 in which the first particles are distributed on the copper foil side of the negative active material layer and the second particles are distributed on the outer surface side of the negative active material layer provides appropriate characteristics in good balance.

As explained above, the battery 1 of the first embodiment provides a high first capacity retention rate substantially equal to that of the comparative battery C2 and also provides a low impedance substantially equal to that of the comparative battery C1. This battery 1 exhibits a lower impedance as compared with the battery (the comparative battery C3) in which graphite (the first particles 22A) and amorphous carbon (the second particles 22B) are uniformly mixed in the entire negative active material layer, and thus can provide a higher capacity retention rate after a low-temperature pulse cycle test. From the above review, since a portion of the negative active material layer contacting with the copper foil contains much first particles, the impedance can be reduced. Furthermore, since an exposed portion on the outer surface of the negative active material layer contains much second particles, the first capacity retention rate can be increased.

In particular, this battery 1 the first particles 22A as the negative active material particles 22 in the first layer L1 of the negative active material layer 21 and the second particles 22B as the negative active material particles 22 in the second layer L2 of the same. Thus, the battery 1 can be provided as a battery exhibiting both the low impedance and the high capacity retention rate after the low-temperature pulse cycle test. Furthermore, the impedance of the battery 1 can be obtained as a good value substantially equal to that of the battery (the comparative battery C1) using only the first particles 22A as the negative active material particles of the negative electrode sheet. In addition, the capacity retention rate of the battery 1 can be obtained as a good value substantially equal to that of the battery (the comparative battery C2) using only the second particles 22B as the negative active material particles of the negative electrode sheet.

In the battery 1 of the first embodiment, especially, the negative active material layer 21 is formed of two layers, i.e., the first layer L1 and the second layer L2. Thus, the negative active material layer 21 can have a simple layered structure. This can facilitate manufacture of the battery 1.

The inventors further investigated the relationship between the density of the first layer to be used in the battery 1 and the battery characteristics. Specifically, there are prepared a plurality of batteries of fifteen types using the negative electrode sheets each formed of the first layer and the second layer as with the aforementioned battery 1. These batteries are designed in advance so that respective first layers have a density of one of five levels; 1.1, 1.2, 1.4, 1.6, and 1.7 g/cm$^3$ and respective second layers have a density of one of three levels; 1.0, 1.2, and 1.3 g/cm$^3$. A combination of the first layer and the second layer of each battery is determined so that the combinations are different from battery to battery.

Each battery is subjected to the aforementioned battery capacity measurement. A battery capacity obtained at that time is referred to as an "initial battery capacity BC0" of each battery. Subsequently, each battery is subjected to a test conducted under a temperature environment of 60° C. to alternately repeat constant current charge and constant current discharge at a current of 2 C for 1000 cycles so that a state of charge (SOC) of each battery becomes 0% SOC and 100% SOC (hereinafter, also referred to as a "60° C.-cycle test"). Thereafter, each battery is subjected to the aforementioned battery capacity measurement again to measure the battery capacity of each battery after the 60° C.-cycle test. A battery capacity of each battery obtained at that time is referred to as a "second posttest battery capacity BC2".

The capacity retention rate (a second capacity retention rate) of each battery after the 60° C.-cycle test is calculated. This second capacity retention rate is a value (percentage) obtained by dividing the "second posttest battery capacity BC2" by the "initial battery capacity BC0" (BC2/BC0×100 (%)).

Figure 4:
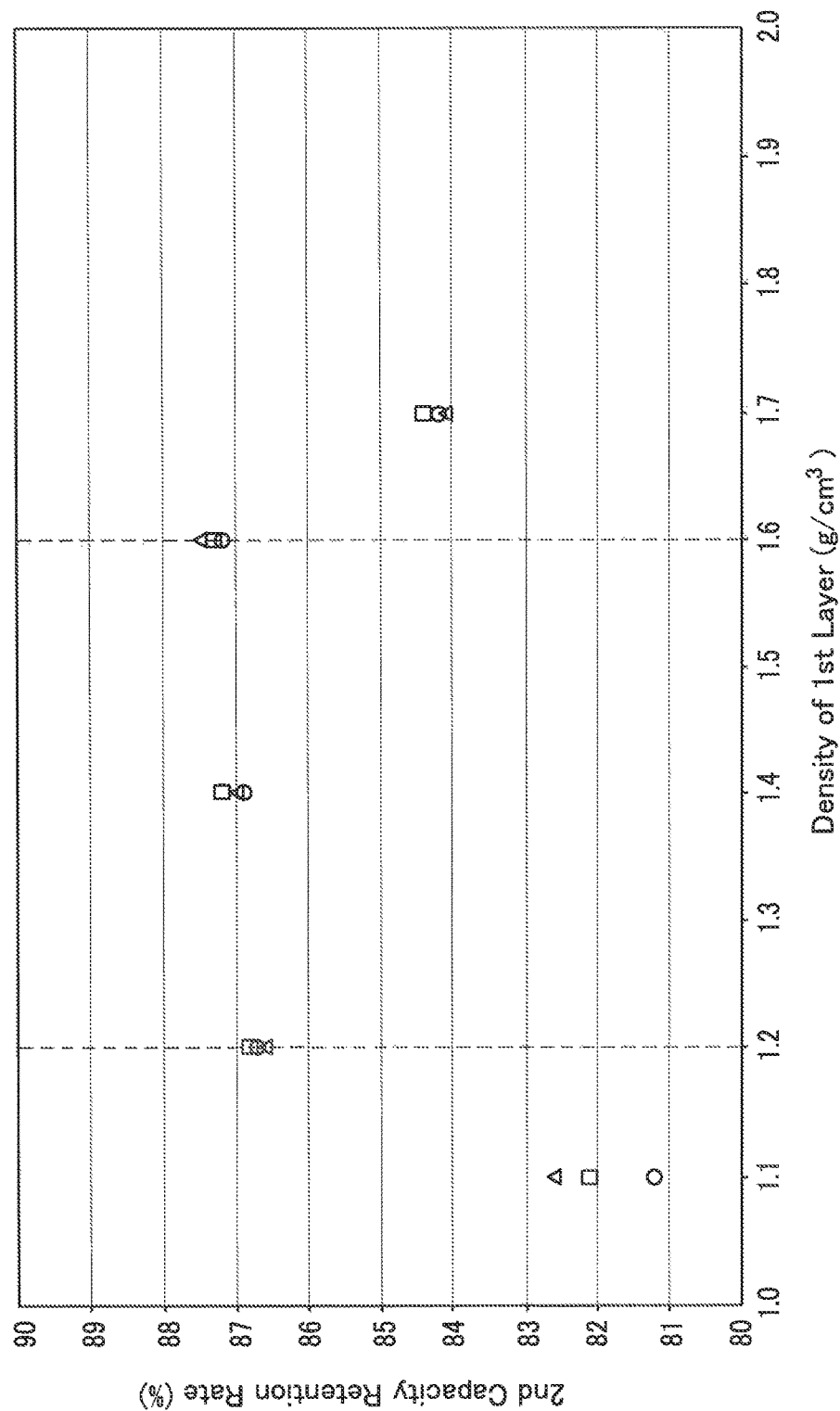
FIG. 4 is a graph showing a relationship between density of a first layer and second capacity retention rate in the first embodiment and the modified example.

A relationship between the density of the first layer of each battery and the second capacity retention rate (the capacity retention rate after the 60° C.-cycle test) of each battery is expressed as a graph in FIG. 4. Results of the batteries each having the density of the second layer being 1.0 g/cm$^3$ are plotted with a circle (○), results of the batteries each having the density of second layer being 1.2 g/cm$^3$ are plotted with a rectangle (□), and results of the batteries each having the density of second layer being 1.3 g/cm$^3$ are plotted with a triangle (Δ). According to this graph, irrespective of the density of the second layer, the second capacity retention rates of the batteries each using the first layer with a density of 1.2, 1.4, or 1.6 g/cm$^3$ are all about 87%, whereas the second capacity retention rates of the batteries each using the first layer with a density of 1.1 or 1.7 g/cm$^3$ are remarkably lower than 87%.

When the batteries are subjected to the above 60° C.-cycle test, SEI having low conductivity is generated on the negative active material particles and thus lithium are consumed by just that much, decreasing the capacity retention rate. It is accordingly conceivable that as this posttest capacity retention rate is lower, particularly, more SEI is generated on the negative active material layer. In the battery including the first layer with a density in a range of 1.2 to 1.6 g/cm$^3$, the first layer has been appropriately pressed and thus its electronic conductivity is not deteriorated due to expansion and contraction. Further, the negative active material layer (the first layer) is less likely to be broken due to too high density. This can prevent a decrease in the capacity retention rate (the second capacity retention rate) after 60° C.-cycle test.

The battery 1 of the first embodiment uses the first layer L1 having a density of 1.2 g/cm$^3$ in a range of 1.2 to 1.6 g/cm$^3$. This battery 1 prevented from causing SEI on the negative active material particles 22 can also be achieved as a battery 1 with a high second capacity retention rate after the above 60° C.-cycle test.

The inventors further investigated a relationship between the density of the second layer to be used in the battery 1 and the battery characteristics in the following manner. Specifically, a plurality of batteries identical to those subjected to the above 60° C.-cycle test are first prepared.

Each battery is subjected to a test conducted under a temperature environment of 0° C. to alternately repeat the constant current charge at a current of 30 C for 10 seconds and the constant current discharge at a current of 30 C for 10 seconds, for 280 cycles (hereinafter, also referred to as "0° C. pulse cycle test"). Then, each battery is subjected to the aforementioned battery capacity measurement to measure the battery capacity of each battery after the 0° C. pulse cycle test. The battery capacity obtained at that time is referred to as a "third posttest battery capacity BC3" of each battery.

The capacity retention rate (a third capacity retention rate) of each battery after the 0° C. pulse cycle test is calculated. This third capacity retention rate is a value (percentage) by dividing the "third posttest battery capacity BC3" of each battery by the "initial battery capacity BC0" of each battery (BC3/BC0×100(%)).

Figure 5:
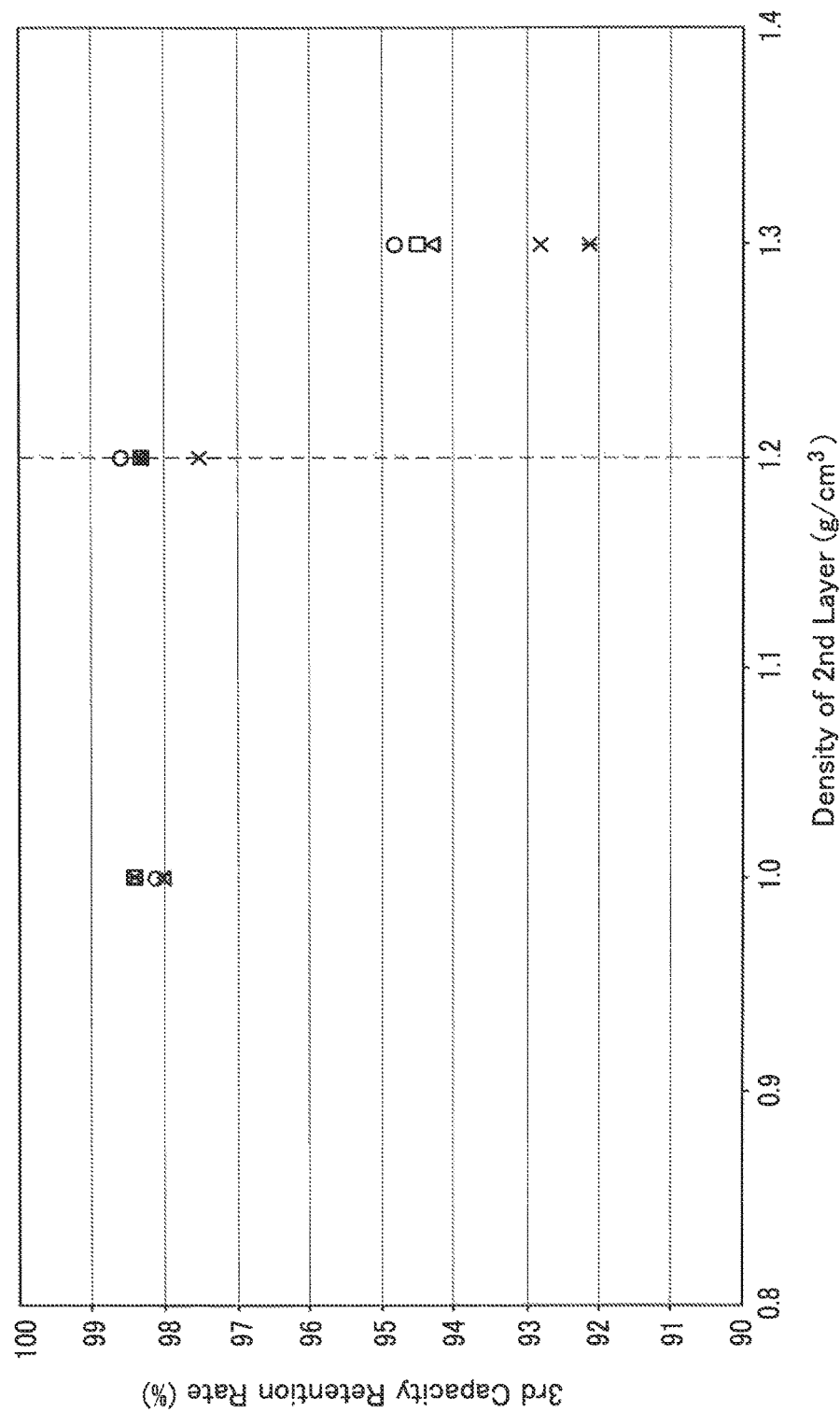
FIG. 5 is a graph showing a relationship between density of a second layer and third capacity retention rate in the first embodiment and the modified example.

A relationship between the density of the second layer of each battery and the third capacity retention rate (the capacity retention rate after the 0° C. pulse cycle test) of each battery is expressed as a graph in FIG. 5. Results of the batteries each having the density of the first layer being 1.1 g/cm$^3$ are plotted with a circle (○), those of the batteries each having the density of the first layer being 1.2 g/cm$^3$ are plotted with a rectangular (□), those of the batteries each having the density of the first layer being 1.4 g/cm$^3$ are plotted with a triangle (Δ), those of the batteries each having the density of the first layer being 1.6 g/cm$^3$ are plotted with a cross mark (x), and those of the batteries each having the density of the first layer being 1.7 g/cm$^3$ are plotted with an asterisk mark (*). According to this graph, irrespective of the density of the first layer, the third capacity retention rates of the batteries each using the second layer with a density of 1.0 or 1.2 g/cm$^3$ are all 97% or more, whereas the capacity retention rates of the batteries each using the second layer with a density of 1.3 g/cm$^3$ are all greatly lower than 97%.

The battery 1 of the first embodiment described above uses the second layer L2 having a density of 1.0 g/cm$^3$, lower than 1.2 g/cm$^3$. In this battery 1, therefore, the third capacity retention rate after the above 0 C.° pulse cycle test can also be increased. Consequently, the battery 1 is made usable for a long period even when charge and discharge are performed with large currents under low temperatures.

Figure 6:
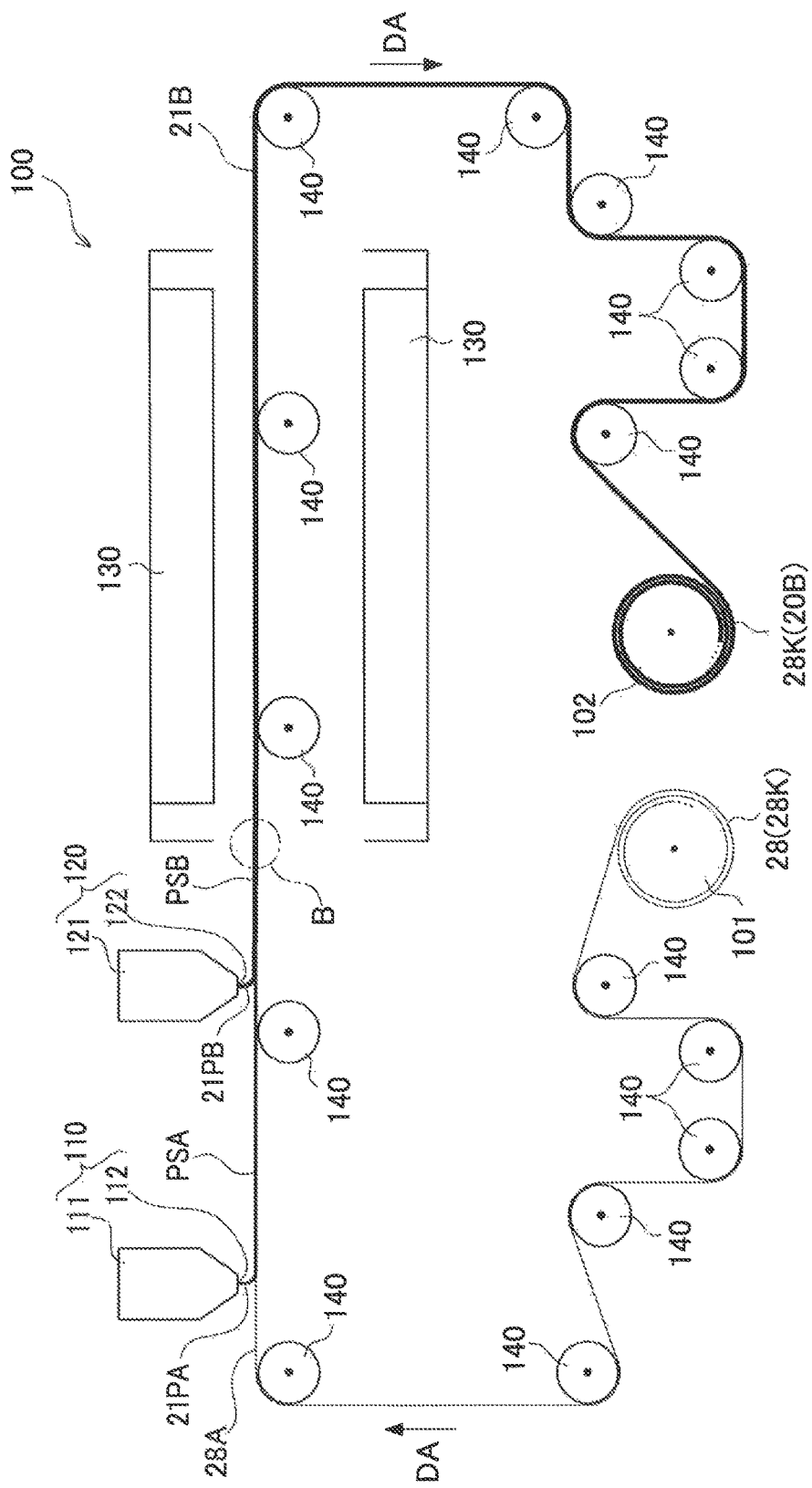
FIG. 6 is an explanatory view showing a lamination coating step and a drying step of a method for manufacturing the battery of the first embodiment.
Figure 7:
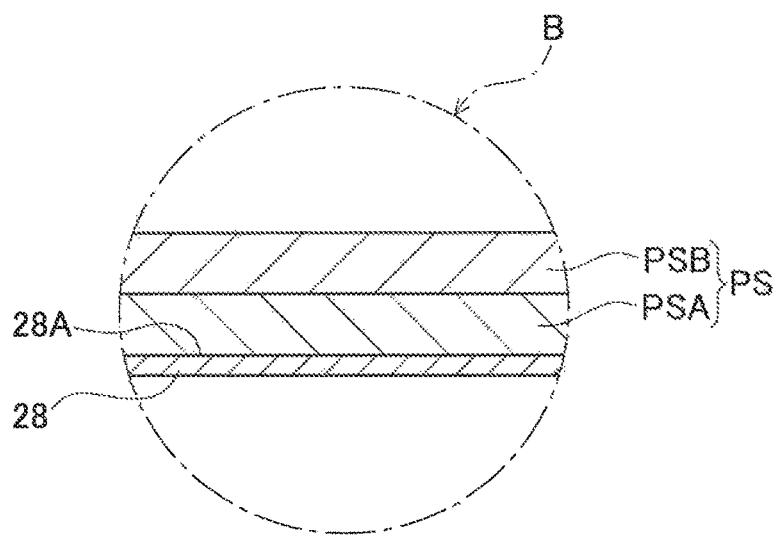
FIG. 7 is an explanatory view showing a state of a laminated coating film (part B in FIG. 6) in the lamination coating step in the first embodiment.

A method for manufacturing the battery 1 in the first embodiment will be explained referring to the drawings. Firstly, a lamination coating step of forming a laminated coating film mentioned later using a coating device 100 will be explained referring to FIGS. 6 and 7. This coating device 100 includes a wind-off part 101, a first coater 110, a second coater 120, heaters 130, a wind-up part 102, and a plurality of auxiliary rollers 140, 140 (see FIG. 6).

The first coater 110 includes a metal paste holding part 111 that stores therein first paste 21PA which will be mentioned later, and an ejection port 112 through which the first paste 21PA stored in the paste holding part 111 is continuously ejected toward the main surface 28A of the copper foil 28. The ejection port 112 has a slit-like shape and is open in parallel with a width direction (in a depth direction in FIG. 6) of the copper foil 28 to eject the first paste 21PA in a strip shape on the main surface 28A of the copper foil 28 advancing in the longitudinal direction DA.

The second coater 120 includes, as with the first coater 110, a metal paste holding part 121 and an ejection port 122. The paste holding part 121 stores therein second paste 21PB mentioned later. The ejection port 122 has a slit-like shape and is open in parallel with the width direction (in the depth direction in FIG. 6) of the copper foil 28 to eject the second paste 21PB in a strip shape on a first coating film PSA formed on the main surface 28A of the copper foil 28 (see FIG. 6).

The heaters 130 are used to heat and dry the first paste 21PA (the first coating film PSA) and the second paste 21PB (the second coating film PSB) coated on the copper foil 28. Accordingly, while the copper foil 28 is passing between the two heaters 130 and 130, the copper foil 28 is heated and thus the first paste 21PA (the first coating film PSA) and the second paste 21PB (the second coating film PSB) coated and laminated on the copper foil 28 are gradually dried. After finishing passing between the heaters 130, the first paste 21PA (the first coating film PSA) and the second paste 21PB (the second coating film PSB) are completely dried, that is, the solvent in the first paste 21PA (the first coating film PSA) and the solvent in the second paste 21PB (the second coating film PSB) have been evaporated.

The lamination coating step is performed using the above coating device 100. Specifically, the first paste 21PA is first prepared by kneading a solvent that is water, the first particles 22A made of natural graphite, carboxymethyl cellulose (CMC, not shown), and styrene-butadiene rubber (SBR, not shown). In the first paste 21PA, a weight ratio of the first particles 22A, CMC, and SBR is set as: $1^{st}$ particles 22A:CMC:SBR=98:1:1.

Separately from the above, the second paste 21PB is prepared in advance by kneading a solvent, the second particles 22B made of low-temperature carbonized coke, CMC, and SBR. In the second paste 21PB, a weight ratio of the second particles 22B, CMC, and SBR is set as: $2^{nd}$ particles 22B:CMC:SBR=98:1:1.

In the first paste 21PA, the ratio (the first ratio Ra) of the first particles 22A to the total amount of the negative active material particles contained in the first paste 21PA is 100%, while the ratio (the second ratio RB) of the second particles 22B is 0%. Furthermore, in the second paste 21PB, the first ratio Ra is 0%, while the second ratio Rb is 100%. Accordingly, the second paste 21PB is higher in the second ratio Rb but lower in the first ratio Ra than the first paste 21PA.

The above first paste 21PA is supplied in the paste holding part 111 of the first coater 110. The second paste 21PB is supplied in the paste holding part 121. Then, the strip-shaped copper foil 28 is wound off from the wind-off part 101 to advance in the longitudinal direction DA, and the first paste 21PA is applied on the main surface 28A of the copper foil 28 by the first coater 110. Thus, the first coating film PSA made of the first paste 21PA is formed on the main surface 28A of the copper foil 28.

On the first coating film PSA, subsequently, the second paste 21PB is applied by the second coater 120. Accordingly, on top of the first coating film PSA, the second coating film PSB made of the second paste 21PB is formed. Thus, the main surface 28A of the copper foil 28 is formed thereon with a laminated coating film PS consisting of the first coating film PSA and the second coating film PSB laminated one on the other (see FIG. 7).

Subsequently, the drying step using the heaters 130 of the coating device 100 is executed. Specifically, the laminated coating film PS is dried by the heaters 130, producing an uncompressed active material layer 21B before press. After this drying step, a one-side coated copper foil 28K having the main surface 28A on one side that carries thereon the uncompressed active material layer 21B is wound once around the wind-up part 102.

Then, using the coating device 100 again, the first paste 21PA and the second paste 21PB are also coated on a main surface 28A on the other side of the one-side coated copper foil 28K (the copper foil 28), forming another laminated coating film PS. This laminated coating film PS is also completely dried by the heaters 130. Thus, an active material laminated sheet 20B before press is produced in which the uncompressed active material layers 21B and 21B are laminated and placed on both the main surfaces 28A and 28A of the copper foil 28. Thereafter, the active material laminated sheet 20B before press is pressed by a press device not shown, producing the negative electrode sheet 20 (see FIG. 2) including two compressed negative active material layers 21 and 21 in lamination form.

The positive electrode sheet 30 is produced separately from the above negative electrode sheet 20. To be concrete, positive electrode paste (not shown) is prepared by mixing positive active material particles, a conductive material, and a binding material, which are not shown, together with a solvent. This paste is coated on both surfaces of an aluminum foil by a die coater, and then dried and pressed. In this manner, the positive electrode sheet 30 is produced.

The positive electrode sheet 30 and the negative electrode sheet 20 produced as above are wound together by interposing the separators 40 therebetween to produce the electrode body 10. Furthermore, the positive current collecting member 91 and the negative current collecting member 92 are respectively welded to the positive electrode sheet 30 and the negative electrode sheet 20. Thereafter, the electrode body 10 is accommodated in the case body 81, and the closing lid 82 is welded to the case body 81 to hermetically close the body 81. Subsequently, an electrolyte is supplied in the case body 81 through a port not shown and then the port is sealed. The battery 1 is thus completed (see FIG. 1).

In the method for manufacturing the battery 1 of the first embodiment, as above, the lamination coating step uses, as active material paste to be coated on a more upper layer on the first paste 21PA, the second paste 21PB containing the second particles 22B at a higher ratio (the second ratio Rb) to the negative active material particles 22 contained in own paste than that of the first paste 21PA and the first particles 22A at a lower ratio (the first ratio Ra) to the negative active material particles 22 contained in own paste than that of the first paste 21PA. Accordingly, it is possible to easily and reliably produce the battery 1 including the negative electrode sheet 20 configured such that a portion (the first layer L1) of the negative active material layer 21 on a side close to the copper foil 28 in the layer thickness direction DT contains the first particles 22A at a higher ratio in the total amount of the negative active material particles 22 and additionally a portion (the second layer L2) of the negative active material layer 21 on a side close to the outer surface 21F in the layer thickness direction DT contains the second particles 22B at a higher ratio in the total amount of the negative active material particles 22. Consequently, the battery 1 exhibiting both the low internal resistance and the high capacity retention rate after the low-temperature pulse cycle test can be manufactured reliably.

In the negative active material layers 21 used in the battery 1 of the first embodiment, the first ratio Ra of the first layer L1 is set to 100%. The second ratio Rb of the second layer L2 is set to 100%. However, the first ratio Ra of the first layer L1 and the second ratio Rb of the second layer L2 do not always have to be set to 100%. It is preferable that the first ratio Ra of the first layer L1 is set to be higher than a ratio of the amount of the first particles to the total amount of the negative active material particles contained in the negative active material layer and the second ratio Rb of the second layer L2 is set to be higher than a ratio of the amount of the second particles to the total amount of the negative active material particles contained in the negative active material layer. Accordingly, for example, in the case where the ratio of the amount of the first particles to the total amount of the negative active material particles contained in the negative active material layer is 50%, the first ratio Ra of the first layer L1 may be set to a higher value (e.g., 85%) than 50%. Further, in the case where the ratio of the amount of the second particles to the total amount of the negative active material particles contained in the negative active material layer is 50%, the second ratio Rb of the second layer L2 may also be set to a higher value (e.g., 80%) than 50%.

The first embodiment shows the battery 1 using the negative electrode sheet 20 including the negative active material layers 21 each formed of two layers, i.e., the first layer L1 and the second layer L2. Besides this, for example, each negative active material layer 21 may be formed of three or more layers. In this case, in the lamination coating step, preferably, laminated coating films are formed by using active material pastes prepared so that active material pastes to be coated for the more upper layers contain the second particles at a higher or equal ratio and the first particle at a lower or equal ratio to the total amount of the negative active material particles contained in own paste.

Modified Example

Next, a modified example of the method for manufacturing a battery according to the invention will be explained referring to accompanying drawings. In the first embodiment, the lamination coating step of applying the second coating film on the first coating film to form the laminated coating film and the drying step of drying the entire laminated coating film at once are performed. On the other hand, the method for manufacturing a battery 101 of the present modified example is different from the aforementioned first embodiment in that a coating step of applying active material paste (one of the first paste and the second paste mentioned above) and a drying step of drying the active material paste coated in the former coating step are alternately repeated. The following explanation is therefore given with a focus on the differences from the first embodiment and similar or identical parts to those in the first embodiment are not explained or are briefly described. Similar or identical parts to those in the first embodiment can provide the same operations and effects and are assigned the same reference signs for explanation.

Figure 8:
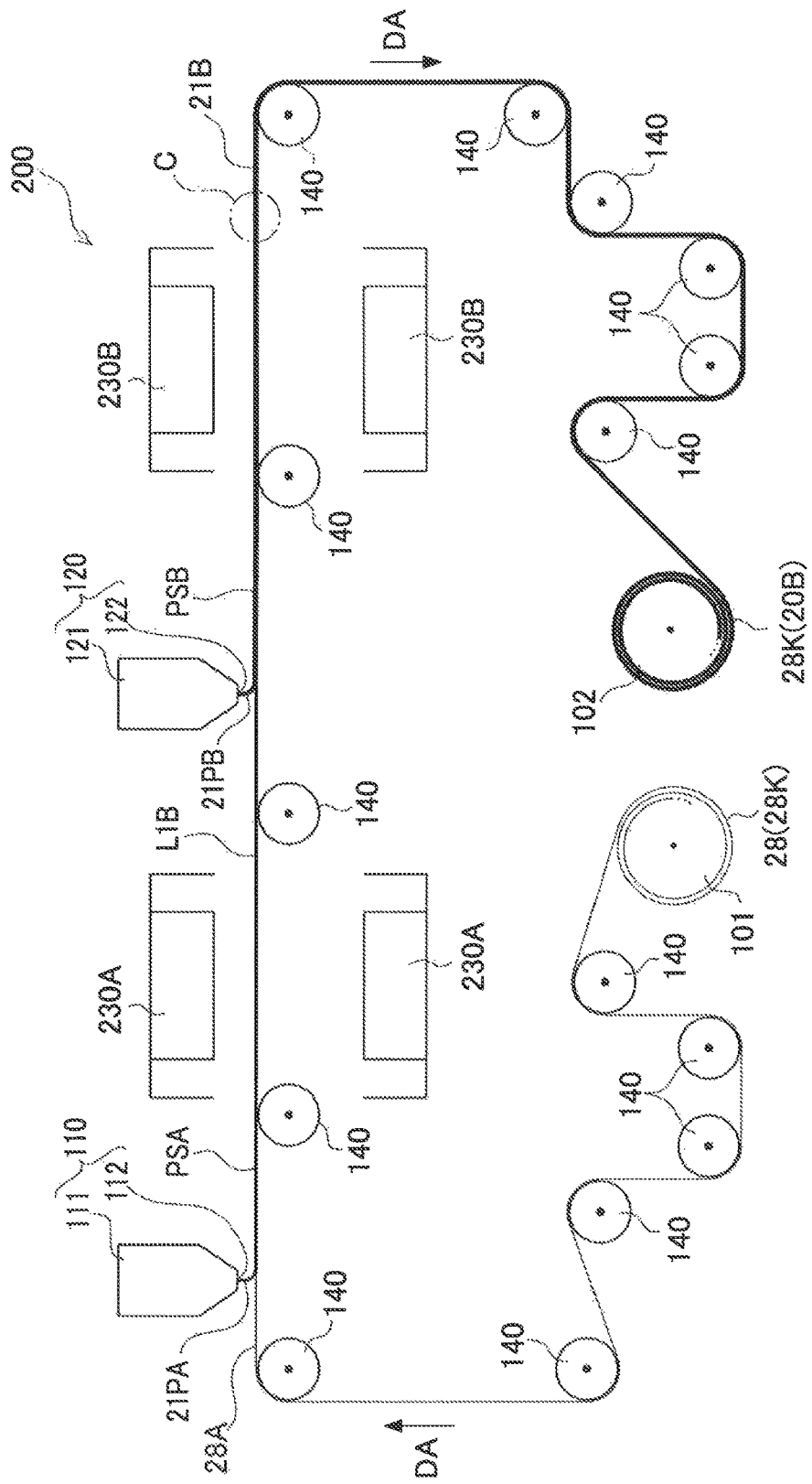
FIG. 8 is an explanatory view showing a coating step and a drying step of a method for manufacturing the battery of the modified example.

In the method for manufacturing the battery 101 of the present modified example, the coating step and the drying step described later are alternately performed by use of a coating device 200 shown in FIG. 8. Specifically, a first coating step of applying a first paste 21PA is followed by a first drying step of drying the coated first paste 21PA. Then, a second coating step of applying a second paste 21PB is followed by a second drying step of drying the coated paste 21PB.

The coating device 200 to be used in the above first coating step, first drying step, second coating step, and second drying step is explained below. This coating device 200 includes, similarly with the aforementioned first embodiment, the wind-off part 101, the first coater 110, the second coater 120, second heaters 230B, the wind-up part 102, and the plurality of auxiliary rollers 140, 140 (see FIG. 8). However, this coating device 200 further includes first heaters 230A between the first coater 110 and the second coater 120 (see FIG. 8).

The first heaters 230A are operated to heat and dry the first paste 21PA (the first coating film PSA) coated on the copper foil 28 by the first coater 110. Thus, the copper foil 28 is heated while advancing between the two first heaters 230A and 230A, and the first paste 21PA (the first coating film PSA) coated on this copper foil 28 is gradually dried. After the copper foil 28 finishes passing between the first heaters 230A, the first paste 21PA (the first coating film PSA) is completely dried.

The second heaters 230B are operated, as with the first heaters 230A, to heat and dry the second paste 21PB (the second coating film PSB) coated on the completely dried first paste 21PA (the first coating film PSA).

By use of the above configured coating device 200, the first coating step is performed. To be concrete, the first paste 21PA and the second paste 21PB are prepared in advance as in the first embodiment. Accordingly, this second paste 21PB is prepared so that a ratio of the amount of the second particles 22B to the total amount of the negative active material particles 22 contained in the second paste 21PB is higher than that of the first paste 21PA, and a ratio of the amount of the first particles 22A to the total amount of the negative active material particles 2 contained in the second paste 21PB is lower than that of the first paste 21PA.

The first paste 21PA is supplied in the paste holding part 111 of the first coater 110 and the second paste 21PB is supplied in the paste holding part 121 of the second coater 120, respectively. Then, the strip-shaped copper foil 28 is wound off from the wind-off part 101 to advance in the longitudinal direction DA, and the first paste 21PA is applied on the main surface 28A of the copper foil 28 by the first coater 110. Thus, the first coating film PSA made of the first paste 21PA is formed on the main surface 28A of the copper foil 28 (see FIG. 8).

Subsequently, the first drying step is performed by use of the first heaters 230A of the coating device 200. Specifically, the first coating film PSA is dried by the first heaters 230A, forming an uncompressed first layer L1B (see FIG. 8).

While the copper foil 28 formed with the uncompressed first layer L1B is advancing in the longitudinal direction DA, furthermore, the second paste 21PB is applied on the uncompressed first layer L1B by the second coater 120 (the second coating step). In the second coating step, in other words, the second paste 21PB is applied on the uncompressed first layer L1B which is a lower-layer negative active material layer made of the dried first paste 21PA already coated on the copper foil 28. Accordingly, the second coating film PSB made of the second paste 21PB is formed as an upper layer on the uncompressed first layer L1B (see FIG. 8).

Figure 9:
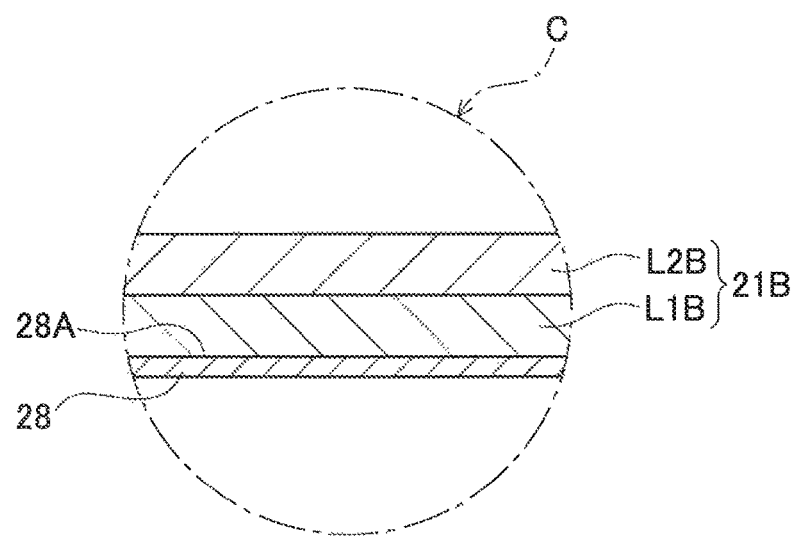
FIG. 9 is an explanatory view showing a state of an uncompressed active material layer (part C in FIG. 8) created by alternately repeating the coating step and the drying step in the modified example.

Subsequently, the second drying step is performed by use of the second heaters 230B of the coating device 200. To be concrete, the second coating film PSB is dried by the second heaters 230B, forming an uncompressed second layer L2B, thereby forming an uncompressed active material layer 21B (see FIGS. 8 and 9). Thereafter, the one-side coated copper foil 28K having the main surface 28A on one side that carries thereon the uncompressed active material layer 21B is wound once around the wind-up part 102.

Then, the coating step and the drying step are repeated using the coating device 200 again with respect to the other main surface 28A of the one-side coated copper foil 28K (the copper foil 28) as in the first embodiment. Thereby, an active material laminated sheet 20B before press is produced in which the uncompressed active material layers 21B and 21B are laminated respectively on both main surfaces 28A and 28A of the copper foil 28.

Thereafter, the active material laminated sheet 20B before press is pressed by a press device not shown as in the first embodiment, producing the negative electrode sheet 20 including the two compressed negative active material layers 21 and 21 laminated one each on both sides of the copper foil 28 (see FIG. 2). The battery 101 (see FIG. 1) is completed through the subsequent steps similar to those in the first embodiment.

In the method for manufacturing the battery 101 in the present modified example, the coating step and the drying step are alternately performed in the order of the first coating step, the first drying step, the second coating step, and the second drying step. The second coating step uses the second paste 21PB having a higher second ratio Rb and a lower first ratio Ra than those of the first paste 21PA coated in the first step. Therefore, the battery 101 can be easily and reliably produced including the negative electrode sheet 20 configured such that a portion (the first layer L1) on the copper foil 28 side of the negative active material layer 21 in the layer thickness direction DT contains the first particles 22A at a higher ratio in the total amount of the negative active material particles 22 and a portion (the second layer L2) on the outer surface 21F side of the negative active material layer 21 in the layer thickness direction DT contains the second particles 22B at a higher ratio in the total amount of the negative active material particles 22. Accordingly, the battery 101 surely providing both the low internal resistance and the high capacity retention rate after the low-temperature pulse cycle test can be manufactured.

In the negative active material layer 21 used in the battery 101 of the present modified example, the first ratio Ra in the first layer L1 is set to 100% as in the first embodiment. The second ratio Rb in the second layer L2 is set to 100%. However, the first ratio Ra in the first layer L1 and the second ratio Rb in the second layer L2 do not always have to be 100%. It is preferable to set the first ratio Ra in the first layer L1 to be higher than the ratio of the amount of the first particles to the total amount of the negative active material particles contained in the negative active material layer and set the second ratio Rb in the second layer L2 to be higher than the ratio of the amount of the second particles to the total amount of the negative active material particles contained in the negative active material layer. Accordingly, for example, in the case where the ratio of the amount of the first particles to the total amount of the negative active material particles contained in the negative active material layer is 50%, the first ratio Ra in the first layer L1 may be set to a higher value (e.g., 70%) than 50%. In the case where the ratio of the amount of the second particles to the total amount of the negative active material particles contained in the negative active material layer is 50%, the second ratio Rb in the second layer L2 may also be set to a higher value (e.g., 75%) than 50%.

The present modified example shows the battery 101 using the negative electrode sheet 20 including the negative active material layers 21 each formed of two layers, i.e., the first layer L1 and the second layer L2. Besides this, for example, each negative active material layer 21 may be formed of three or more layers. In this case, the coating step preferably uses active material pastes prepared so that active material pastes to be coated at later stages contains the second particles at a higher or equal ratio and the first particles at a lower or equal ratio to the negative active material particles contained in own paste, and applies the pastes on the negative current collector sheet or the lower-layer negative active material layer. In the first and second drying steps in the present modified example, the first paste 21PA and the second paste 21PB are completely dried. As an alternative, the pastes may be half dried in drying performed in mid-course (the first drying step).

Second Embodiment

Figure 10:
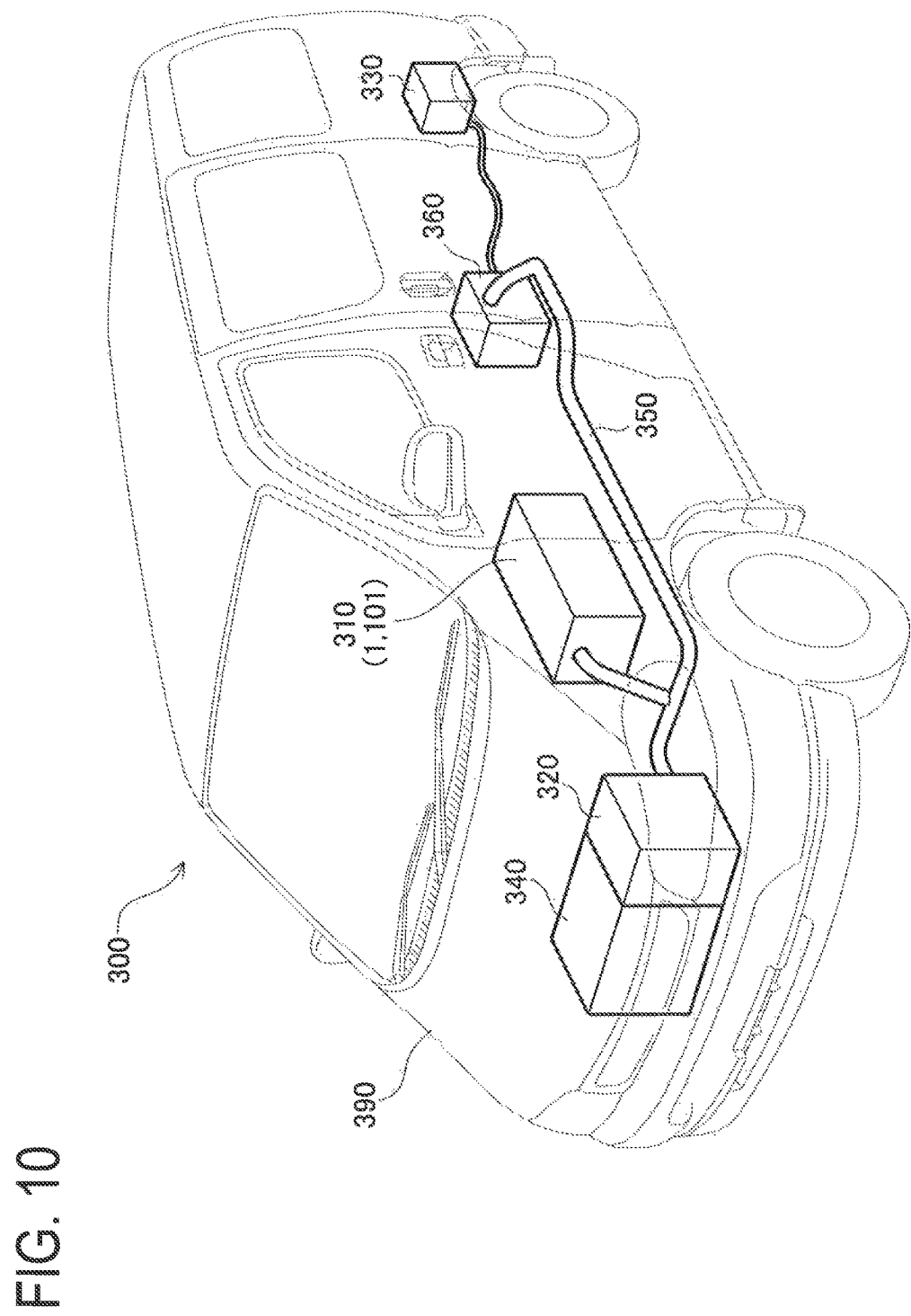
FIG. 10 is an explanatory view of a vehicle in a second embodiment.

A vehicle 300 in a second embodiment mounts a battery pack 310 containing a plurality of the batteries 1 (or the batteries 101) described above. To be concrete, as shown in FIG. 10, the vehicle 300 is a hybrid vehicle to be driven by an engine 340, a front motor 320, and a rear motor 330 in combination. This vehicle 300 includes a vehicle body 390, the engine 340, the front motor 320 attached to the engine 340, the rear motor 330, a cable 350, an inverter 360, and the battery pack 310 having a rectangular box shape. The battery pack 310 contains a plurality of the batteries 1 (the batteries 101) mentioned above.

Since the vehicle 300 in the second embodiment mounts the batteries 1 (or the batteries 101) each providing both the low internal resistance and the high capacity retention rate after the low-temperature pulse cycle test, the vehicle 300 can exhibit a stable battery performance.

The present invention is explained in the above first and second embodiments and modified example, but is not limited thereto. The invention may be embodied in other specific forms without departing from the essential characteristics thereof.

For instance, in the first embodiment and others, the flake graphite is used as the first particles 22A. As alternatives, natural graphite (vein graphite, amorphous graphite, etc.) and artificial graphite may be used. Although the low-temperature carbonized coke is used as the second particles 22B, hard carbon (non-graphitizable carbon) may be used as the second particles.

The invention claimed is:

1. A lithium ion secondary battery comprising:
a negative electrode sheet including a negative current collector sheet and a negative active material layer formed on the negative current collector sheet, the negative active material layer containing negative active material particles; and
a positive electrode sheet facing the negative electrode sheet through separators interposed therebetween,
wherein the negative active material particles include at least first particles made of graphite and second particles made of amorphous carbon,
the negative active material layer is configured so that:
a ratio of an amount of the first particles to a total amount of the negative active material particles contained in a portion of the negative active material layer on a side close to the negative current collector sheet in a layer thickness direction is higher than a ratio of an amount of the first particles to a total amount of the negative active material particles contained in the negative active material layer, and
a ratio of an amount of the second particles to a total amount of the negative active material particles contained in a portion of the negative active material layer on a side close to a surface of the negative active material layer in the layer thickness direction is higher than a ratio of an amount of the second particles to a total amount of the negative active material particles contained in the negative active material layer, the negative active material layer is formed of a plurality of layers laminated in the layer thickness direction, the plurality of layers including a first layer located on a side closest to the negative current collector sheet and a second layer located on a side closest to the surface of the negative active material layer, the negative active material particles of the first layer are composed of the first particles, the negative active material particles of the second layer are composed of the second particles, and the first layer has a density of 1.2 to 1.6 g/cm$^3$.

2. The lithium ion secondary battery according to claim 1, wherein the negative active material layer is formed of the first layer and the second layer.

3. The lithium ion secondary battery according to claim 1, wherein the second layer has a density of 1.2 g/cm$^3$ or less.

4. A method for manufacturing a lithium ion secondary battery, comprising:

a negative electrode sheet including a negative current collector sheet and a negative active material layer formed on the negative current collector sheet, the negative active material layer containing negative active material particles; and a positive electrode sheet facing the negative electrode sheet through separators interposed therebetween, wherein the negative active material particles includes at least first particles made of graphite and second particles made of amorphous carbon, the negative active material layer is configured so that:

a ratio of an amount of the first particles to a total amount of the negative active material particles contained in a portion of the negative active material layer on a side close to the negative current collector sheet in a layer thickness direction is higher than a ratio of an amount of the first particles to a total amount of the negative active material particles contained in the negative active material layer, and a ratio of an amount of the second particles to a total amount of the negative active material particles contained in a portion of the negative active material layer on a side close to a surface of the negative active material layer in the layer thickness direction is higher than a ratio of an amount of the second particles to a total amount of the negative active material particles contained in the negative active material layer, the negative active material layer is formed of a plurality of layers laminated in the layer thickness direction, the plurality of layers including a first layer located on a side closest to the negative current collector sheet and a second layer located on a side closest to the surface of the negative active material layer, the negative active material particles of the first layer are composed of the first particles, the negative active material particles of the second layer are composed of the second particles, and the first layer has a density of 1.2 to 1.6 g/cm$^3$, wherein the method includes:

a lamination coating step of applying active material paste containing the negative active material particles on the negative current collector sheet more than once to form a laminated coating film; and a drying step of drying the laminated coating film, and the lamination coating step uses active material pastes prepared so that the pastes to be coated for more upper layers have a higher or equal ratio of the second particles and a lower or equal ratio of the first particles relative to a total amount of the negative active material particles contained in own paste.

5. A method for manufacturing a lithium ion secondary battery, comprising:

a negative electrode sheet including a negative current collector sheet and a negative active material layer formed on the negative current collector sheet, the negative active material layer containing negative active material particles; and a positive electrode sheet facing the negative electrode sheet through separators interposed therebetween, wherein the negative active material particles includes at least first particles made of graphite and second particles made of amorphous carbon, the negative active material layer is configured so that:

a ratio of an amount of the first particles to a total amount of the negative active material particles contained in a portion of the negative active material layer on a side close to the negative current collector sheet in a layer thickness direction is higher than a ratio of an amount of the first particles to a total amount of the negative active material particles contained in the negative active material layer, and a ratio of an amount of the second particles to a total amount of the negative active material particles contained in a portion of the negative active material layer on a side close to a surface of the negative active material layer in the layer thickness direction is higher than a ratio of an amount of the second particles to a total amount of the negative active material particles contained in the negative active material layer, the negative active material layer is formed of a plurality of layers laminated in the layer thickness direction, the plurality of layers including a first layer located on a side closest to the negative current collector sheet and a second layer located on a side closest to the surface of the negative active material layer, the negative active material particles of the first layer are composed of the first particles, the negative active material particles of the second layer are composed of the second particles, and the first layer has a density of 1.2 to 1.6 g/cm$^3$, wherein the method includes:

a coating step of applying active material paste containing the negative active material particles on the negative current collector sheet or on a lower-layer negative active material layer made of already coated and dried active material paste; and a drying step of drying the coated paste, the coating step and the drying step being alternately repeated, and the coating step uses the active material pastes prepared so that the pastes to be coated at later stages have a higher or equal ratio of the second particles and a lower or equal ratio of the first particles relative to a total amount of the negative active material particles contained in own paste.

6. The lithium ion secondary battery according to claim 2, wherein the second layer has a density of 1.2 g/cm$^3$ or less.

7. The method for manufacturing a lithium ion secondary battery according to claim 4, wherein the negative active material layer is formed of the first layer and the second layer.

8. The method for manufacturing a lithium ion secondary battery according to claim 4, wherein the second layer has a density of 1.2 g/cm$^3$ or less.

9. The method for manufacturing a lithium ion secondary battery according to claim 7, wherein the second layer has a density of 1.2 g/cm$^3$ or less.

10. The method for manufacturing a lithium ion secondary battery according to claim 5, wherein the negative active material layer is formed of the first layer and the second layer.

11. The method for manufacturing a lithium ion secondary battery according to claim 5, wherein the second layer has a density of 1.2 g/cm$^3$ or less.

12. The method for manufacturing a lithium ion secondary battery according to claim 10, wherein the second layer has a density of 1.2 g/cm$^3$ or less.

* * * * *